United States Patent
Morikawa et al.

(10) Patent No.: US 11,414,563 B2
(45) Date of Patent: Aug. 16, 2022

(54) ETHYLENE-VINYLALCOHOL COPOLYMER AQUEOUS SOLUTION

(71) Applicant: KURARAY CO., LTD., Kurashiki (JP)

(72) Inventors: Keisuke Morikawa, Kurashiki (JP); Tatsuya Tanida, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 121 days.

(21) Appl. No.: 16/771,399

(22) PCT Filed: Dec. 11, 2018

(86) PCT No.: PCT/JP2018/045420
§ 371 (c)(1),
(2) Date: Jun. 10, 2020

(87) PCT Pub. No.: WO2019/117118
PCT Pub. Date: Jun. 20, 2019

(65) Prior Publication Data
US 2020/0392364 A1 Dec. 17, 2020

(30) Foreign Application Priority Data
Dec. 12, 2017 (JP) .............................. JP2017-237503

(51) Int. Cl.
*C09D 129/04* (2006.01)
*C08K 5/05* (2006.01)
*C09D 7/20* (2018.01)
*C09D 7/63* (2018.01)

(52) U.S. Cl.
CPC .............. *C09D 129/04* (2013.01); *C08K 5/05* (2013.01); *C09D 7/20* (2018.01); *C09D 7/63* (2018.01)

(58) Field of Classification Search
CPC .................................................. C09D 129/04
See application file for complete search history.

(56) References Cited

U.S. PATENT DOCUMENTS 6,238,606 B1 5/2001 Kunieda et al.
2002/0028871 A1 3/2002 Kawahara et al.

FOREIGN PATENT DOCUMENTS

| JP | 11-21788 A | 1/1999 |
| JP | 11-90927 A | 4/1999 |
| JP | 2002-80606 A | 3/2002 |
| JP | 2002-121290 A | 4/2002 |

OTHER PUBLICATIONS

Machine translation of JPH1121788 (Year: 1999).*
International Search Report dated Mar. 19, 2019 in PCT/JP2018/045420 filed on Dec. 11, 2018, 1 page.
U.S. Appl. No. 16/756,243, filed Apr. 15, 2020, Tatsuya Tanida, et al.

* cited by examiner

*Primary Examiner* — Wenwen Cai
(74) *Attorney, Agent, or Firm* — Oblon, McClelland, Maier & Neustadt, L.L.P.

(57) ABSTRACT

The present invention provides an aqueous solution containing an ethylene-vinyl alcohol copolymer (A), an alcohol (B) having 1 to 4 carbon atoms and water (C), wherein an ethylene unit content of the ethylene-vinyl alcohol copolymer (A) is 1 mol % or more and less than 20 mol %; a crystallinity in water Cw (30° C.) at 30° C. and a crystallinity in water Cw (70° C.) at 70° C. as determined by pulse NMR satisfy Formula (I); the ethylene-vinyl alcohol copolymer (A) is contained in 0.1 to 100 parts by mass based on 100 parts by mass of water (C); and the alcohol (B) is contained in 0.01 to 30 parts by mass based on 100 parts by mass of water (C). Thus, there is provided an aqueous solution of an ethylene-vinyl alcohol copolymer, which forms a less number of lumps and generates a reduced amount of fibrillar precipitate even when a shear stress is applied.

$$4 \leq \frac{100 - Cw(30° C.)}{100} \times [Cw(30° C.) - Cw(70° C.)] \leq 22 \quad (I)$$

4 Claims, No Drawings

ETHYLENE-VINYLALCOHOL COPOLYMER AQUEOUS SOLUTION

TECHNICAL FIELD

The present invention relates to an aqueous solution containing an ethylene-vinyl alcohol copolymer which is highly soluble in water, a particular alcohol and water. The present invention also relates to a coated article produced using an aqueous solution containing the ethylene-vinyl alcohol copolymer.

BACKGROUND ART

Vinyl alcohol polymers represented by a polyvinyl alcohol (hereinafter, sometimes abbreviated as "PVA") is known to be a water-soluble synthetic polymer, which is extensively used in various applications such as a starting material for a synthetic fiber vinylon, a paper processing agent, a fiber treatment agent, an adhesive, a stabilizer for emulsion polymerization and suspension polymerization, a binder for an inorganic material and a film. In particular, PVAs, which have higher film-formability and crystallinity, have been used as, for example, a silicone retention aid for a barrier film, a barrier paper, an oil resistant paper or a release paper.

In particular, a release paper generally has a PVA-containing filling layer (barrier layer) for the purpose of reducing a gap between pulp fibers constituting a paper and improving a surface yield of a silicone applied on a paper surface. Particularly, a partially saponified PVA having excellent barrier properties is suitably used.

However, a partially saponified PVA, which is less water-resistant, embraces problem that humidifying during an adhesive processing step causes elution of the PVA, leading to blocking. It further embraces a problem that a water-dispersible varnish cannot be used in a post-processing step.

In order to solve the problems, Patent Reference No. 1 has described that both barrier properties and water resistance can be achieved by using a mixture of an ethylene-vinyl alcohol copolymer and a carboxymethylcellulose. However, the ethylene-vinyl alcohol copolymer, which contains hydrophobic ethylene units, is less soluble in water than an unmodified PVA, so that dissolution at an elevated temperature for a long period is required for preparing an aqueous solution, and cost increase for dissolution is, therefore, inevitable. If a saponification degree is reduced for avoiding cost increase for dissolution, particles aggregate during dissolution to form lumps, rather resulting in a longer dissolution time.

For an aqueous solution of the ethylene-vinyl alcohol copolymer, shear stress applied to the aqueous solution during preparation of the solution and coating causes a lot of fibrillar precipitate in a coating liquid. Thus, there is room for improvement in processability.

PRIOR ART REFERENCES

Patent References

Patent Reference No. 1: JP 11-21788 A

SUMMARY OF THE INVENTION

Problems to be Solved by the Invention

In view of these circumstances, an objective of this invention is to provide an aqueous solution comprising an ethylene-vinyl alcohol copolymer which is highly soluble in water, a particular alcohol and water, which generates a reduced amount of fibrillar precipitate even when a shear stress is applied. Another objective is to provide a coated article produced by applying the aqueous solution.

Means for Solving the Problems

The above problems are solved by providing an aqueous solution containing an ethylene-vinyl alcohol copolymer (A), an alcohol (B) having 1 to 4 carbon atoms and water (C), wherein an ethylene unit content of the ethylene-vinyl alcohol copolymer (A) is 1 mol % or more and less than 20 mol %; a crystallinity in water Cw (30° C.) at 30° C. and a crystallinity in water Cw (70° C.) at 70° C. as determined by pulse NMR satisfy Formula (I); the ethylene-vinyl alcohol copolymer (A) is contained in 0.1 to 100 parts by mass based on 100 parts by mass of water (C); and the alcohol (B) is contained in 0.01 to 30 parts by mass based on 100 parts by mass of water (C).

$$4 \leq \frac{100 - Cw(30° \text{ C.})}{100} \times [Cw(30° \text{ C.}) - Cw(70° \text{ C.})] \leq 22 \quad \text{(I)}$$

It is preferred that the alcohol (B) is a monohydric alcohol having 1 to 4 carbon atoms.

It is preferred that the ethylene-vinyl alcohol copolymer (A) has a viscosity-average polymerization degree of 200 to 5000. It is also preferred that the ethylene-vinyl alcohol copolymer (A) has a saponification degree of 80 to 99.99 mol %.

A coated article produced by coating a substrate surface with the aqueous solution is also a preferable embodiment of the present invention.

Effects of the Invention

In an aqueous solution of the present invention, less lumps are formed, a solubility of an ethylene-vinyl alcohol copolymer is high, and even under shear stress, formation of fibrillar precipitate is reduced. Furthermore, the aqueous solution can be applied to a substrate, to reduce particles on the coated surface and to provide a coated article with excellent oxygen barrier properties.

MODES FOR CARRYING OUT THE INVENTION

An aqueous solution of the present invention is characterized in that the aqueous solution contains an ethylene-vinyl alcohol copolymer (A), an alcohol (B) having 1 to 4 carbon atoms and water (C), wherein an ethylene unit content of the ethylene-vinyl alcohol copolymer (A) is 1 mol % or more and less than 20 mol %; a crystallinity in water Cw (30° C.) at 30° C. and a crystallinity in water Cw (70° C.) at 70° C. as determined by pulse NMR satisfy Formula (I); the ethylene-vinyl alcohol copolymer (A) is contained in 0.1 to 100 parts by mass based on 100 parts by mass of water (C); and the alcohol (B) is contained in 0.01 to 30 parts by mass based on 100 parts by mass of water (C).

$$4 \leq \frac{100 - Cw(30° \text{ C.})}{100} \times [Cw(30° \text{ C.}) - Cw(70° \text{ C.})] < 22 \quad \text{(I)}$$

[Ethylene-Vinyl Alcohol Copolymer (A)]

The ethylene-vinyl alcohol copolymer (A) contained in an aqueous solution of the present invention is particularly characterized that an ethylene unit content is 1 mol % or more and less than 20 mol %; and a crystallinity in water Cw (30° C.) at 30° C. and a crystallinity in water Cw (70° C.) at 70° C. as determined by pulse NMR (nuclear magnetic resonance absorption) satisfy the above Formula (I). This will be described below.

(Crystallinity in Water)

First, meaning of analyzing a polymer sample by pulse NMR spectroscopy will be described. In a pulse NMR spectrometer, there is a magnetostatic field generated by an electromagnet in the spectrometer. In a magnetostatic field, a nuclear spin direction of a hydrogen nucleus is aligned to the direction of the magnetostatic field. When a pulsed field is applied to such a state, the nuclear spin of the hydrogen nucleus is aligned to a direction perpendicular to the magnetostatic field, that is, an excited state. Then, a process to the state that the direction of the excited nuclear spin macroscopically returns to the original direction of the magnetostatic field is called as $T_2$ relaxation or transverse relaxation, and a time for the process is called as a relaxation time (Tau). For relaxation of a single component, a magnetization intensity (y) at a time (t) is represented by formula (II) using a relaxation strength (A) in an excited state, a relaxation time (Tau) and constants ($y_0$, W). In the equation, W is a Weibull coefficient. When W=1, formula (II) becomes an Exp type while when W=2, it becomes a Gaussian type. For a common polymer sample, $1 \leq W \leq 2$.

$$y = y_0 + A \times \exp\left[-\frac{1}{W} \times \left(\frac{t}{Tau}\right)^W\right] \quad \text{(II)}$$

In $T_2$ relaxation, a hydrogen nucleus attenuates while exchanging energy with another hydrogen nucleus. Therefore, when molecular mobility of the sample is high, interaction between mutually adjacent protons is small so that energy attenuation of the whole system unlikely occurs, resulting in a longer relaxation time. In contrast, when its molecular mobility is low, a relaxation time is shorter. Therefore, for a crystalline polymer material, a relaxation time is shorter in a crystal region while a relaxation time is longer in an amorphous region. An actual crystalline polymer has a crystal region and an amorphous region, and in its relaxation curve, the sum of a relaxation component derived from the crystal region with a shorter relaxation time and a relaxation component derived from the amorphous region with a longer relaxation time is observed. A magnetization intensity (y) of the whole sample at time (t) is represented by formula (III) using a constant ($y_0$), where a relaxation strength derived from the crystal region is $A_1$, a relaxation strength derived from the amorphous region is $A_2$, a relaxation time derived from the crystal region is $Tau_1$, and a relaxation time derived from the amorphous region is $Tau_2$. Since a crystalline component often shows Gaussian relaxation, W is fixed at W=2 in the first term representing a crystalline component in formula (III). $A_1/(A_1+A_2)$ derived from this formula is a crystallinity as determined by pulse NMR. Herein, pulse NMR measurement was conducted using pulse sequence called as a Solid-echo method.

$$y = y_0 + A_1 \times \exp\left[-0.5 \times \left(\frac{t}{Tau_1}\right)^2\right] + A_2 \times \exp\left[-\frac{1}{W} \times \left(\frac{t}{Tau_2}\right)^W\right] \quad \text{(III)}$$

As described above, a ratio of a crystalline component to an amorphous component in a polymer sample can be determined from a relaxation curve obtained by pulse NMR. An ethylene-vinyl alcohol copolymer is a hydrophilic polymer having a number of hydroxy groups, and thus is swollen in water, leading to reduction in crystallinity, a degree of which significantly depends on a water temperature. At a higher water temperature, a swelling degree increases, so that crystallinity is reduced. We have herein focused on a crystallinity in water Cw (30° C.)(%) at 30° C. and a crystallinity in water Cw (70° C.)(%) at 70° C. as determined by pulse NMR. An ethylene-vinyl alcohol copolymer (A) of the present invention satisfies formula (I).

$$4 \leq \frac{100 - Cw(30°\,\text{C.})}{100} \times [Cw(30°\,\text{C.}) - Cw(70°\,\text{C.})] \leq 22 \quad \text{(I)}$$

In formula (I), $[(100-Cw(30°\,C))/100]$ represents a ratio of an amorphous region at 30° C., and takes a value of 0 to 1. Furthermore, $[Cw(30°\,C)-Cw(70°\,C.)]$ is a difference between crystallinities in water between at 30° C. and 70° C., that is, an indicator of increase in an amorphous region associated with water-temperature increase, and takes a value of 0 to 100. Therefore, formula (I) as multiplication of these is an indicator of solubility of the ethylene-vinyl alcohol copolymer (A), and the value of formula (I) is more influenced by a larger absolute value of $[Cw(30°\,C.)-Cw(70°\,C)]$. Generally, an ethylene-vinyl alcohol copolymer with an ethylene unit content of 1 mol % or more and less than 20 mol % is soluble in water because of a smaller content of ethylene units. Such a water-soluble ethylene-vinyl alcohol copolymer generally has a large value of $[(100-Cw(30°\,C.))/100]$ and a small value of $[Cw(30°\,C.)-Cw(70°\,C.)]$, resulting in a small value of formula (I), or alternatively, have a small value of $[(100-Cw(30°\,C.))/100]$ and a large value of $[Cw(30°\,C.)-Cw(70°\,C.)]$, resulting in a large value of formula (I). Specifically, when a value of formula (I) is less than 4, the particles are soluble at a low temperature while easily forming a lump, and once formed, the lump is less soluble in water, leading to a longer time for complete dissolution. The lower limit of formula (I) is preferably 5 or more, more preferably 6 or more. On the other hand, when a value of formula (I) is more than 22, solubility in water is reduced, leading to a longer time for complete dissolution. The upper limit of formula (I) is preferably 21 or less, more preferably 20 or less. When formula (I) satisfies a particular range, an ethylene-vinyl alcohol copolymer (A) which is rapidly dissolved and do not easily form a lump during dissolution can be obtained.

For measurement, a sample of ethylene-vinyl alcohol copolymer (A) is still placed in $H_2O\text{-}d_2$ at each temperature (30° C., 70° C.) for 40 min, followed by pulse NMR spectroscopy at the same temperature as that during still placing. The range from 0 to 0.8 ms in a relaxation curve obtained is fitted to formula (Ill) using the least square error method.

An ethylene-vinyl alcohol copolymer (A) satisfying formula (I) can be produced by a special method for producing an ethylene-vinyl alcohol copolymer comprising a polymerization step, a saponification step, a pulverizing step, a deliquoring step and a drying step. The production method will be detailed later. By employing such a special production method, the present invention has for the first time provided an ethylene-vinyl alcohol copolymer (A) which satisfies formula (I) and which is highly soluble in water. The ethylene-vinyl alcohol copolymer (A) will be further detailed below.
(Vinyl Ester)

An ethylene-vinyl alcohol copolymer (A) is produced by a method comprising a step of saponifying an ethylene-vinyl ester copolymer prepared by copolymerizing ethylene with a vinyl ester. Examples of a vinyl ester which can be used include vinyl formate, vinyl acetate, vinyl propionate, vinyl valerate, vinyl caprate, vinyl laurate, vinyl stearate, vinyl benzoate, vinyl pivalate and vinyl versatate, particularly preferably vinyl acetate.
(Ethylene Unit Content)

A content of ethylene units in the ethylene-vinyl alcohol copolymer (A) is 1 mol % or more and less than 20 mol %. If a content of ethylene units is less than 1 mol %, oxygen barrier properties of a coated article obtained is deteriorated under a high humidity. A content of ethylene units is preferably 1.5 mol % or more, more preferably 2 mol % or more. If a content of ethylene units is 20 mol % or more, the ethylene-vinyl alcohol copolymer (A) is insoluble in water, and preparation of an aqueous solution becomes difficult. A content of ethylene units is preferably 15 mol % or less, more preferably 10 mol % or less, further preferably 8.5 mol % or less.

A content of ethylene units is determined, for example, by $^1$H-NMR of an ethylene-vinyl ester copolymer as a precursor or re-acetylation product of the ethylene-vinyl alcohol copolymer (A). A sample of the ethylene-vinyl ester copolymer is reprecipitation-purified three or more times using a mixed solution of n-hexane and acetone, and dried at 80° C. for three days under reduced pressure to prepare an ethylene-vinyl ester copolymer for analysis. The ethylene-vinyl ester copolymer for analysis is dissolved in DMSO-$d_6$ followed by $^1$H-NMR (500 MHz) analysis at 80° C. A content of ethylene units can be calculated using peaks derived from a main-chain methine of the vinyl ester (4.7 to 5.2 ppm) and peaks derived from a main-chain methylene of ethylene and the vinyl ester (0.8 to 1.6 ppm).
(Saponification Degree)

A saponification degree of the ethylene-vinyl alcohol copolymer (A) is preferably, but not limited to, 80 to 99.99 mol %. If a saponification degree is less than 80 mol %, the ethylene-vinyl alcohol copolymer (A) is insufficiently soluble in an aqueous solution obtained. A saponification degree is more preferably 82 mol % or more, further preferably 85 mol % or more. If a saponification degree is more than 99.99 mol %, there is a tendency that it is difficult to stably produce the ethylene-vinyl alcohol copolymer (A). A saponification degree is more preferably 99.5 mol % or less, further preferably 99 mol % or less, particularly preferably 98.5 mol % or less. A saponification degree of the ethylene-vinyl alcohol copolymer (A) can be determined in accordance with JIS K6726 (1994).
(Viscosity-Average Polymerization Degree)

A viscosity-average polymerization degree of the ethylene-vinyl alcohol copolymer (A) is preferably, but not limited to, 200 to 5000. If a viscosity-average polymerization degree is less than 200, strength of a coated surface in a coated article produced is reduced. A viscosity-average polymerization degree is more preferably 250 or more, further preferably 300 or more, particularly preferably 400 or more. If a viscosity-average polymerization degree is more than 5000, an ethylene-vinyl alcohol copolymer aqueous solution tends to be too viscous to be conveniently handled. A viscosity-average polymerization degree is more preferably 4500 or less, further preferably 4000 or less, particularly preferably 3500 or less. A viscosity-average polymerization degree P can be determined in accordance with JIS K6726 (1994). Specifically, an ethylene-vinyl alcohol copolymer (A) is re-saponified to a saponification degree of 99.5 mol % or more, and after purification, a viscosity-average polymerization degree can be determined from a limiting viscosity [η] (L/g) as measured in water at 30° C. in accordance with the following equation.

$$P=([\eta]\times 10000/8.29)^{(1/0.62)}$$

(Other Monomer Units)

An ethylene-vinyl alcohol copolymer (A) can contain monomer units other than vinyl alcohol units, ethylene units and vinyl ester units as long as the effects of the present invention are not impaired. Examples of such monomers include a-olefins such as propylene, n-butene and isobutylene; acrylic acid and salts thereof; acrylic acid esters; methacrylic acid and salts thereof; methacrylic acid esters; acrylamides, acrylamide derivatives such as N-methylacrylamide, N-ethylacrylamide, N,N-dimethylacrylamide, diacetone acrylamide, acrylamide propanesulfonic acid and salts thereof, acrylamide propyldimethylamine and salts or quaternary salts thereof, N-methylol acrylamide and derivatives thereof; methacrylamide; methacrylamide derivatives such as N-methylmethacrylamide, N-ethylmethacrylamide, methacrylamide propanesulfonic acid and salts thereof, methacrylamide propyldimethylamine and salts or quaternary salts thereof, N-methylol methacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate and allyl chloride; unsaturated dicarboxylic acids and salts or esters thereof such as maleic acid, itaconic acid and fumaric acid; vinylsilyl compounds such as vinyltrimethoxysilane; and isopropenyl acetate. A content of these monomers is, depending on an objective or use thereof, preferably 10 mol % or less, more preferably less than 5 mol %, further preferably less than 1 mol %, particularly preferably less than 0.5 mol %.

[Method for Producing Ethylene-Vinyl Alcohol Copolymer (A)]

A preferable method for producing an ethylene-vinyl alcohol copolymer (A) is a production method comprising a polymerization step of copolymerizing ethylene and a vinyl ester to give an ethylene-vinyl ester copolymer; a saponification step of saponifying the ethylene-vinyl ester copolymer to give a solid block comprising an ethylene-vinyl alcohol copolymer and a solvent; a pulverizing step of pulverizing the solid block to give wet particles; a deliquoring step of mechanically removing some of the solvent from the wet particles to give deliquored particles; and a drying step of removing the remaining solvent from the deliquored particles by heating to give dry particles, wherein the deliquored particles contain 40 to 65% by mass of the solvent; and in the deliquored particles, a content of particles passing through a sieve with a mesh size of 5.6 mm is 80% by mass or more, and a content of particles passing through a sieve with a mesh size of 1.0 mm is less than 2% by mass.

It is important that like the above production method, deliquored particles obtained by pulverizing the solid block after the saponification step and then deliquoring them contain a particular rate of the solvent and have a particular particle size distribution. Thus, in the course of preparing an aqueous solution of an ethylene-vinyl alcohol copolymer (A), a lump is not formed, resulting in a higher solution rate. There will be detailed each step of the production method.
(Polymerization Step)

A vinyl ester can be copolymerized with ethylene by a well-known method such as bulk polymerization, solution polymerization, suspension polymerization and emulsion polymerization. Among these, bulk polymerization or solution polymerization in which polymerization proceeds in a neat system or in an organic solvent such as an alcohol can be generally employed, and preferably a solution polymerization is employed. Examples of the alcohol include lower alcohols such as methanol and ethanol, particularly preferably methanol. Polymerization can be carried out by any style of batch polymerization, semi-batch polymerization and continuous polymerization. A polymerization reactor can be a batch reactor, a tube reactor, a continuous stirred tank reactor or the like. An initiator used for the copolymerization can be selected from known initiators such as azo initiators and peroxide initiators including 2,2'-azobis(isobutyronitrile), 2,2'-azobis(4-methoxy-2,4-dimethylvaleronitrile), 2,2'-azobis(2,4-dimethyl-valeronitrile), benzoyl peroxide and n-propyl peroxydicarbonate.

There are no particular restrictions to a polymerization temperature, and it is preferably about 0 to 180° C., more preferably room temperature to 160° C., further preferably 30 to 150° C. When polymerization is conducted at a temperature of a boiling point of a solvent used in polymerization or lower, either of boiling polymerization under reduced pressure and non-boiling polymerization under normal pressure can be selected. When polymerization is conducted at a temperature of a boiling point of a solvent used in polymerization or higher, either of non-boiling under pressure and boiling polymerization under pressure can be selected.

An ethylene pressure in a polymerization reactor during polymerization is preferably 0.01 to 0.9 MPa, more preferably 0.05 to 0.7 MPa, further preferably 0.1 to 0.65 MPa. A polymerization ratio at an outlet of a polymerization reactor is, but not limited to, preferably 10 to 90%, more preferably 15 to 85%.

In the polymerization, a chain transfer agent can coexist for adjusting a viscosity-average polymerization degree of the resulting ethylene-vinyl ester copolymer. Preferable examples of a chain transfer agent include aldehydes such as acetaldehyde, propionaldehyde, butylaldehyde and benzaldehyde; ketones such as acetone, methyl ethyl ketone, hexanone and cyclohexanone; mercaptans such as 2-hydroxyethane thiol; thiocarboxylic acids such as thioacetic acid; and halogenated hydrocarbons such as trichloroethylene and perchloroethylene. Inter glia, aldehydes and ketones can be suitably used. The amount of the chain transfer agent depends on a chain transfer constant of the chain transfer agent added and a viscosity-average polymerization degree of a targeted ethylene-vinyl ester copolymer, and generally it is 0.1 to 10 parts by mass based on 100 parts by mass of a vinyl ester used.

(Saponification Step)

The ethylene-vinyl ester copolymer obtained in the polymerization step is saponified by alcoholysis or hydrolysis in the presence of a catalyst in an organic solvent. Examples of a catalyst used in the saponification step include basic catalysts such as sodium hydroxide, potassium hydroxide and sodium methoxide; and acidic catalysts such as sulfuric acid, hydrochloric acid and p-toluenesulfonic acid. Examples of an organic solvent used in the saponification step include, but not limited to, alcohols such as methanol and ethanol; esters such as methyl acetate and ethyl acetate; ketones such as acetone and methyl ethyl ketone; and aromatic hydrocarbons such as benzene and toluene. These can be used alone or in combination of two or more. Among these, it is convenient and preferable that saponification reaction is conducted in the presence of sodium hydroxide as a basic catalyst using methanol or a mixed solution of methanol and methyl acetate as a solvent. The amount of the saponification catalyst is preferably 0.001 to 0.5 as a molar ratio to vinyl ester monomer units in the ethylene-vinyl ester copolymer. The molar ratio is more preferably 0.002 or more. The molar ratio is more preferably 0.4 or less, further preferably 0.3 or less.

A suitable embodiment of the saponification step is as follows. First, a saponification catalyst such as sodium hydroxide is added to a solution of the ethylene-vinyl ester copolymer obtained in the polymerization step, followed by admixing. Here, a solvent is preferably methanol. At the initiation of admixing, the mixture is a homogeneous liquid, and as the saponification reaction proceeds and the vinyl ester units in the polymer are saponified and converted to vinyl alcohol units, solubility in the solvent is reduced so that the polymer precipitates from the solution. Here, the solution contains methyl acetate formed by alcoholysis by methanol. As the saponification proceeds, the amount of polymer precipitate gradually increases to give a slurry which then loses fluidity. Therefore, for allowing the saponification reaction to homogeneously proceed, it is important that the system is fully admixed before loss of fluidity.

There are no particular restrictions to a method for mixing a solution of an ethylene-vinyl ester copolymer and a saponification catalyst, and various methods such as a static mixer, a kneader and a stirring blade. Preferably, a static mixer is used because it can achieve continuous and homogeneous mixing. Here, in a pipe connected to a polymerization tank, a saponification catalyst is added to the solution of the ethylene-vinyl ester copolymer after the polymerization step, and then the mixture is passed through a static mixer for mixing to give a paste. A reaction temperature in the static mixer is generally 20 to 80° C.

There are no particular restrictions to a method for allowing a saponification reaction of the ethylene-vinyl ester copolymer in the paste passing through the static mixer to proceed, and a preferable method is by placing the paste on a moving belt and moving the belt in a tank kept at a constant temperature while allowing the saponification reaction to proceed. The paste on the belt loses fluidity to be a solid state and the saponification reaction further proceeds in a solid state. This method allows for continuously proceeding the saponification reaction in a solid state, giving a solid block containing the ethylene-vinyl alcohol copolymer and the solvent. A saponification temperature is preferably 20 to 60 C. If a saponification temperature is too low, a reaction rate is reduced. A saponification temperature is preferably 25° C. or higher, further preferably 30° C. or higher. If a saponification temperature is too high, a large amount of the solvent evaporates, so that a solvent content in a solid block obtained is reduced, leading to deterioration in solubility of the ethylene-vinyl alcohol copolymer obtained. A saponification temperature is more preferably 55° C. or lower, further preferably 50° C. or lower. A saponification time is preferably 5 min or more and 2 hours or less. A saponification time is more preferably 8 min or more, further preferably 10 min or more. A saponification time is more preferably 1 hour or less, further preferably 45 min or less.

(Pulverizing Step)

The solid block obtained in the saponification step is pulverized to give wet particles containing a solvent. There are no particular restrictions to a pulverizer used herein as long as a rotation speed or the like of the pulverizer can be adjusted to achieve a particle size distribution as described below, and any known pulverizer or crusher can be used. In terms of dynamic properties of an ethylene-vinyl alcohol copolymer obtained through the saponification step, a cutting type crusher such as a cutter mill, a Guillotine cutter, a reciprocating cutter type crusher, and a uniaxial-shear, biaxial-shear or triaxial-shear crusher is preferable. In pulverization, a Rockwell hardness (HRC) of a cutting blade contacting the solid block is preferably 40 to 70. The hardness is more preferably 45 or more. The hardness is more preferably 65 or less. A rotation speed of the cutting blade is preferably 200 to 550 rpm. The rotation speed is more preferably 225 rpm or more, further preferably 250 rpm or more. The rotation speed is more preferably 500 rpm or less, further preferably 450 rpm or less.

Conventionally, a solid block obtained in a saponification step has been generally pulverized by a pulverizer equipped with a cutting blade with a Rockwell hardness of less than 40, which is operated at a rotation speed of more than 550 rpm. Since the cutting blade used has a low Rockwell hardness, the cutting blade tends to be abraded and thus cutting using such an abraded cutting blade tends to lead to uneven pulverization. When a solid block is pulverized at a high rotation speed, the solid block is strongly vibrated up and down at the inlet of the crusher by impact of pulverization, leading to uneven breaking during pulverization. In such circumstances, it has been difficult to stably obtain particles having a particular particle size distribution as described below. If a Rockwell hardness of the cutting blade is more than 70, the blade is of high hardness while being of lower toughness, and thus during pulverization, fine chippings are generated in the cutting blade, leading to tendency to uneven pulverization. If a rotation speed of the pulverizer is less than 200 rpm, there is tendency to reduction in pulverization efficiency.

(Washing Step)

After the pulverizing step, if necessary, wet particles can be washed by adding a washing step for removing impurities such as sodium acetate. Examples of a washing liquid include lower alcohols such as methanol and ethanol; lower fatty acids such as methyl acetate; and mixtures thereof. There are no particular restrictions to the conditions of the washing step, and the particles are preferably washed at 20° C. to a boiling point of the washing liquid for 30 min to 10 hours.

(Deliquoring Step)

After the pulverizing step and sometimes after the washing step, some of the solvent was mechanically removed from the wet particles, to give deliquored particles. A deliquoring machine is preferably a centrifugal deliquoring machine. A centrifugal deliquoring machine is preferably able to conduct continuous centrifugal deliquoring, including an automatic discharge type centrifugal deliquoring machine, a screw discharge type centrifugal deliquoring machine, a vibration discharge type centrifugal deliquoring machine and an extrusion plate type centrifugal deliquoring machine. Conventionally, a squeeze deliquoring machine has been used for deliquoring of pulverized particles. However, for achieving a solvent content of deliquored particles obtained within the above particular range, squeezing strength must be increased, and consequently, the deliquored particles are deformed or broken so that a particle size distribution deviates from the range as described below. In other words, it is difficult to simultaneously achieve desired values of a particle size distribution and a solvent content of deliquored particles described below by the conventional method. In the deliquoring step, by employing the above centrifugal deliquoring machine, deliquored particles having a particle size distribution and a solvent content as described below can be easily achieved.

It is important that deliquored particles thus obtained contains 40 to 65% by mass of a solvent. If a solvent content is less than 40% by mass, some particles are excessively dried, and after the drying step, an ethylene-vinyl alcohol copolymer (A) satisfying formula (I) cannot be obtained due to contamination with a poorly-soluble ethylene-vinyl alcohol copolymer. A solvent content is preferably 42% by mass or more, more preferably 45% by mass or more. If a solvent content is more than 65% by mass, difference in heat history between the surface and the inside of particles is generated, so that an ethylene-vinyl alcohol copolymer (A) satisfying formula (I) cannot be obtained and energy required for drying is increased. A solvent content is preferably 62% by mass or less, more preferably 59% by mass or less. A solvent content herein is an average of those of deliquored particles. A solvent content of deliquored particles is preferably lower by 3% by mass or more, more preferably by 5% by mass or more, further preferably 10% by mass or more, than a solvent content of wet particles.

It is important that in the deliquored particles, a content of particles passing through a sieve with a mesh size of 5.6 mm is 80% by mass or more, and a content of particles passing through a sieve with a mesh size of 1.0 mm is less than 2% by mass. In other words, it is important that not only coarse particles but also fine particles are not contained so much. Herein, a mesh size of a sieve is determined in accordance with a nominal mesh size of JIS Z 8801-1 (2006).

In the deliquored particles, a content of particles passing through a sieve with a mesh size of 5.6 mm is 80% by mass or more. If the deliquored particles contain many coarse particles, drying at a higher temperature or for a long time is required for fully drying the particles to the center, and energy required for drying is increased. Furthermore, by drying at a high temperature or for a long time, smaller particles are excessively crystallized, and thus after the drying step, contamination with poorly-soluble ethylene-vinyl alcohol copolymer particles occurs. Existence of coarse particles causes uneven heat transfer in a drier. Considering these situations, an ethylene-vinyl alcohol copolymer (A) satisfying formula (I) are not obtained. A content of particles passing through a sieve with a mesh size of 5.6 mm is preferably 82% by mass or more, more preferably 85% by mass or more. In the light of a production efficiency, a content of particles passing through a sieve with a mesh size of 5.6 mm is preferably 99% by mass or less, more preferably 98% by mass or less.

In the deliquored particles, a content of particles passing through a sieve with a mesh size of 1.0 mm is less than 2% by mass. If the deliquored particles contains many fine particles, subsequent drying causes excessive crystallization of the fine particles, leading to contamination with many poorly-soluble ethylene-vinyl alcohol copolymer particles after the drying step. Furthermore, the fine particles reside in the bottom of the drier and are excessively heated, leading to excessively higher crystallinity and again contamination with ethylene-vinyl alcohol copolymer particles with poor solubility. In such circumstances, an ethylene-vinyl alcohol copolymer (A) satisfying formula (I) cannot be obtained. A content of particles passing through a sieve with a mesh size of 1.0 mm is preferably 1.9% by mass or less, more preferably 1.8% by mass or less. In the light of a production efficiency, a content of particles passing through a sieve with a mesh size of 1.0 mm is preferably 0.05% by mass or more, more preferably 0.1% by mass or more.

(Drying Step)

The deliquored particles after the deliquoring step can be subjected to the drying step, to give an ethylene-vinyl alcohol copolymer. Specifically, hot-air drying using a cylindrical drier is preferable, and a particle temperature during the drying is preferably 80 to 120° C. If the temperature is too low, a production efficiently is reduced. The temperature is preferably 90° C. or higher. If the temperature is too high, excessively crystallized particles are generated, leading to deterioration in solubility. The temperature is more preferably 110° C. or lower. A drying time is preferably 2 to 10 hours, more preferably 3 to 8 hours. With drying conditions within the above ranges, an ethylene-vinyl alcohol copolymer satisfying formula (I) can be easily produced.

(Additional Pulverizing Step)

After the drying step, it is preferable that an additional pulverizing step for further reducing a particle size is conducted, whereby particles with a higher dissolution rate in water. A pulverizer used in the additional pulverizing step can be the same pulverizer as that used in the above pulverizing step.

The ethylene-vinyl alcohol copolymer (A) obtained by the additional pulverizing step preferably has a content of particles passing through a sieve with a mesh size of 2.5 mm of 80% by mass or more. If a content of particles passing through a sieve with a mesh size of 2.5 mm is less than 80% by mass, a dissolution rate is reduced when dissolving the ethylene-vinyl alcohol copolymer (A) in water to prepare an aqueous solution, so that heating for a long time is required. A content of particles passing through a sieve with a mesh size of 2.5 mm is more preferably 83% by mass or more, further preferably 85% by mass or more. Furthermore, in the ethylene-vinyl alcohol copolymer particles, a content of particles passing through a sieve with a mesh size of 1.0 mm is preferably 80% by mass or more. Thus, a dissolution rate in water is further improved. A content of particles passing through a sieve with a mesh size of 1.0 mm is more preferably 83% by mass or more, further preferably 85% by mass or more.

In the ethylene-vinyl alcohol copolymer (A) obtained in the additional pulverizing step, a content of particles passing through a sieve with a mesh size of 0.15 mm is preferably 20% by mass or less. If a content of particles passing through a sieve with a mesh size of 0.15 mm is more than 20% by mass, a lump tends to be formed in an aqueous solution containing the ethylene-vinyl alcohol copolymer (A). A content of particles passing through a sieve with a mesh size of 0.15 mm is more preferably 17% by mass or less, further preferably 15% by mass or less.

[Alcohol (B)]

An alcohol (B) contained in an aqueous solution of the present invention is an alcohol having 1 to 4 carbon atoms, preferably a monohydric alcohol having 1 to 4 carbon atoms. Examples of such an alcohol (B) include at least one selected from the group consisting of methanol, ethanol, 1-propanol, 2-propanol, 1-butanol, 2-butanol, isobutyl alcohol and tert-butyl alcohol, and two or more alcohols having 1 to 4 carbon atoms can be combined. Among these, methanol, ethanol, 1-propanol and 2-propanol are preferable from the viewpoint that when the aqueous solution obtained is applied, a lower-boiling-point solvent can be more easily removed and processability is improved. Ethanol, 1-propanol and 2-propanol are more preferable from the viewpoint that generation of fibrillar precipitate is further reduced.

An aqueous solution of an ethylene-vinyl alcohol copolymer (A) can be prepared as an aqueous solution containing a particular amount of an alcohol (B) having 1 to 4 carbon atoms, in which generation of fibrillar precipitate can be reduced even when a shear stress is applied to the aqueous solution. Though the reason is not clearly understood, the alcohol (B) present in the aqueous solution would allow for attenuating hydrophobic interaction between ethylene-vinyl alcohol copolymers (A) in the aqueous solution, resulting in inhibition of generation of fibrillar precipitate.

[Aqueous Solution]

An aqueous solution of the present invention contains the above ethylene-vinyl alcohol copolymer (A), an alcohol (B) having 1 to 4 carbon atoms and water, wherein the ethylene-vinyl alcohol copolymer (A) is contained in 0.1 to 100 parts by mass based on 100 parts by mass of water (C), and the alcohol (B) is contained in 0.01 to 30 parts by mass based on 100 parts by mass of water (C).

A content of the ethylene-vinyl alcohol copolymer (A) is 0.1 to 100 parts by mass based on 100 parts by mass of water (C). With a content of the ethylene-vinyl alcohol copolymer (A) being within the above range, viscosity of an aqueous solution obtained is within a proper range, so that an aqueous solution in which less lumps are formed and generation of fibrillar precipitate is further reduced can be easily provided. A content of the ethylene-vinyl alcohol copolymer (A) is preferably 0.5 parts by mass or more, more preferably 1 part by mass or more. A content of the ethylene-vinyl alcohol copolymer (A) is preferably 70 parts by mass or less, more preferably 50 parts by mass or less, further preferably 30 parts by mass or less.

A content of the alcohol (B) is 0.01 to 30 parts by mass based on 100 parts by mass of water (C). With a content of the alcohol (B) being within the above range, organic components do not excessively volatilize, and an aqueous solution in which less lumps are formed and generation of fibrillar precipitate is further reduced can be easily provided. A content of the alcohol (B) is preferably 0.05 parts by mass or more, more preferably 0.1 parts by mass or more, further preferably 0.5 parts by mass or more, particularly preferably 1.0 parts by mass or more. A content of the alcohol (B) is preferably 25 parts by mass or less, more preferably 20 parts by mass or less, further preferably 15 parts by mass or less.

There are no restrictions to a method for preparing an aqueous solution of the present invention, and preferably, it is prepared by dissolving the ethylene-vinyl alcohol copolymer (A) in the alcohol (B) and water (C). In this method, the ethylene-vinyl alcohol copolymer (A) can be dissolved in a mixed solvent of the alcohol (B) and water (C), to give an aqueous solution. Alternatively, in this method, the ethylene-vinyl alcohol copolymer (A) is dissolved or impregnated in one of the alcohol (B) or water (C), to which the other solvent is then added for dissolution, to give an aqueous solution.

[Other Components]

An aqueous solution of the present invention can contain, in addition to the ethylene-vinyl alcohol copolymer (A), the alcohol (B) having 1 to 4 carbon atoms and water, an aliphatic alcohol having 5 or more carbon atoms, an inorganic lamellar compound, a crosslinking agent, a surfactant, a leveling agent, an antifungal agent, a preservative and the like.

Examples of an inorganic lamellar compound include micas, talc, montmorillonite, kaolinite and vermiculite. By adding an inorganic lamellar compound, strength and handleability of a coated article obtained are improved.

Examples of a crosslinking agent include epoxy compounds, isocyanate compounds, aldehyde compounds, titanium compounds, silica compounds, aluminum compounds, zirconium compounds and boron compounds. Among these, silica compounds such as colloidal silica and alkyl silicates are preferable. By adding a crosslinking agent, water resistance can be endowed.

[Coated Article]

A coated article produced by coating a substrate surface with the aqueous solution comprising the ethylene-vinyl alcohol copolymer (A), the alcohol (B) having 1 to 4 carbon atoms and water is also a preferable embodiment of the present invention.

Examples of a substrate on which an aqueous solution of the present invention is to be applied include films such as a polyolefin film, a polyester film and a polyamide film; a paper; and an nonwoven fabric. A thickness of a substrate (a final thickness when it is oriented) is preferably 5 to 100 µm.

A coating temperature is preferably 20 to 80° C. Preferable examples of a coating method include, but not limited to, a gravure roll coating method, a reverse gravure coating method, a reverse roll coating method, a mayer bar coating method, a curtain coater method, a size press method, a blade coater method, a knife coater method, a slot die method, a sym-sizer method and a casting method. Examples of a coating method include a method comprising stretching and/or heating a substrate film followed by coating, and a method comprising, after coating, stretching and/or heating the coated laminate.

A coated article can be a laminate as such or a monolayer film after peeling from a substrate. Alternatively, the monolayer film obtained can be laminated with another film to produce the laminate, which can be used.

A coating amount of an aqueous solution of the present invention is preferably 0.3 to 200 $g/m^2$, more preferably 0.5 to 150 $g/m^2$ as dry mass. If a coating amount is less than 0.3 $g/m^2$, there is a tendency that air permeability of a coated article obtained is reduced. If a coating amount is more than 200 $g/m^2$, there is a tendency that during a drying process, bubbles are engulfed so that a smooth coating surface cannot be obtained.

For a method for drying a substrate surface coated with an aqueous solution of the present invention, a variety of heat drying methods such as hot-air heating, heating using a gas-heater, and heating using an infrared-heater can be appropriately employed.

An adhesive component layer can be inserted between a coating layer made of an aqueous solution of the present invention and a substrate layer in the light of improving adhesiveness. The adhesive component can be applied to the surface of a substrate film before coating with an aqueous solution or used by mixing it with an aqueous solution.

Herein, as an approach for evaluating oxygen barrier properties of a coated article, an oxygen transmission rate was measured using MOCON type OX-TRAN2/20 from Modern Control, Inc. in accordance with a method described in JIS K7126 (equal pressure method).

(Other Applications)

An aqueous solution of the present invention containing an ethylene-vinyl alcohol copolymer (A) can be used for various applications, examples of which are, but not limited to, as follows.

(1) Application for dispersant for vinyl chlorides: a dispersion stabilizer for suspension polymerization and a dispersion aid for vinyl chloride and vinylidene chloride, (2) Application for covering agent: a sizing, a fiber treatment agent, a leather finishing agent, a paint, an anti-fogging agent, a metal corrosion inhibitor, a brightening agent for zinc plating, an antistatic agent, (3) Application for adhesive/binder: an adhesive, a sticking agent, a remoistening adhesive, various binders, and additive for a cement and a mortar, (4) Application for dispersion stabilizer: a dispersion stabilizer for an organic or inorganic pigment such as a paint and an adhesive; a dispersion stabilizer for emulsion polymerization for various vinyl compounds; and a post-emulsifier such as Bitumen, (5) Application for paper processing: a paper strengthening agent, an oil-resistance/solvent-resistance imparting agent, a smoothness improver, a surface gloss improving aid, an extender, a barrier agent, a light-resistance imparting agent, a water resistant additive, a dye/developer dispersant, an adhesion improver and a binder, (6) Application for agriculture: a binder for an agrochemical binder, an agrochemical spreader, an agrochemical coating, a soil conditioner, an anti-erosion agent, and an agrochemical dispersion, (7) Application for medicines and cosmetics: a granulating binder, a coating agent, an emulsifier, a patch, a binder, a film preparation substrate, and a film-forming agent, (8) Application for viscosity modifier: a thickener and a rheology modifier, (9) Application for flocculant: a flocculant for aquatic suspended matter and dissolved matter and a metal flocculant,

(10) Application for film: a water-soluble film, a polarizing film, a barrier film, a film for wrapping a textile product, a seed-growing sheet, a vegetation sheet, a seed tape, and a hygroscopic sheet,

(11) Application for shaped article: a fiber, a film, a sheet, a pipe, a tube, a leakage prevention film, a water-soluble fiber for a chemical lace and a sponge,

(12) Application for resin raw material: a raw material for a polyvinyl butyral, a raw material for a photosensitive resin, a raw material for a graft polymer, and a raw material for various gels. and

(13) Application for post-reaction: post-reaction with a low-molecular organic compound, a macromolecular organic compound or an inorganic compound.

The present invention encompasses various combination aspects within the technical scope of the present invention as long as the present invention is beneficially effective.

EXAMPLES

There will be further specifically described the present invention with reference to examples, but the present invention is not limited to these examples in any way.

[Content of Ethylene Units in Ethylene-Vinyl Alcohol Copolymer (A)]

It was determined from $^1$H-NMR of an ethylene-vinyl ester copolymer as a precursor or re-acetylation product of an ethylene-vinyl alcohol copolymer.

Specifically, an ethylene-vinyl ester copolymer obtained was reprecipitation-purified three times or more using a mixed solution of n-hexane and acetone, and then dried under reduced pressure at 80° C. for 3 days, to prepare an ethylene-vinyl ester copolymer for analysis. The ethylene-vinyl ester copolymer for analysis was dissolved in DMSO-$d_6$ and analyzed by $^1$H-NMR (500 MHz) at 80° C. A content of ethylene units was calculated using peaks derived from a main-chain methine of the vinyl ester (4.7 to 5.2 ppm) and peaks derived from a main-chain methylene of ethylene and the vinyl ester (0.8 to 1.6 ppm).

[Viscosity-Average Polymerization Degree of Ethylene-Vinyl Alcohol Copolymer (A)]

A viscosity-average polymerization degree of an ethylene-vinyl alcohol copolymer (A) was determined in accordance with the method as described in JIS K6726 (1994).

[Saponification Degree of Ethylene-Vinyl Alcohol Copolymer (A)]

A saponification degree of an ethylene-vinyl alcohol copolymer (A) was determined in accordance with the method as described in JIS K6726 (1994).

[Crystallinity in Water of Ethylene-Vinyl Alcohol Copolymer (A)]

A sample of ethylene-vinyl alcohol copolymer (A) was still placed in $H_2O$-$d_2$ at each temperature (30° C., 70° C.) for 40 min, followed by pulse NMR spectroscopy at the same temperature as that during still placing. The range from 0 to 0.8 ms in a relaxation curve obtained was fitted to formula (III) using the least square error method.

$$y = y_0 + A_1 \times \exp\left[-0.5 \times \left(\frac{t}{Tau_1}\right)^2\right] + A_2 \times \exp\left[-\frac{1}{W} \times \left(\frac{t}{Tau_2}\right)^W\right] \quad \text{(III)}$$

Production Example 1

(Polymerization Step)

A continuous polymerization tank equipped with a reflux condenser, a material supply line, a reaction liquid removing line, a thermometer, a nitrogen inlet, an ethylene inlet and a stirring blade was used. To the continuous polymerization tank were continuously supplied 631 L/hr of vinyl acetate, 160 L/hr of methanol, and 7.6 L/hr of a 1% solution of 2,2'-azobis(4-methoxy-2,4-dimethylvaleronitrile) in methanol, using a constant rate pump. An ethylene pressure in the tank was adjusted to be 0.61 MPa. A polymerization solution was continuously removed from the continuous polymerization tank such that the liquid level in the polymerization tank was kept constant. The reaction was adjusted such that a polymerization ratio at the outlet of the continuous polymerization tank was 43%. A residence time in the continuous polymerization tank was 5 hours. A temperature at the outlet of the continuous polymerization tank was 60° C. A polymerization liquid was collected from the continuous polymerization tank and methanol vapor was introduced to the collected liquid to remove unreacted vinyl acetate monomer, to give a solution of an ethylene-vinyl ester copolymer (PVAc) in methanol (concentration: 40% by mass).

(Saponification Step)

To a solution of the ethylene-vinyl ester copolymer obtained in the polymerization step in methanol (concentration: 40% by mass) was added a solution of sodium hydroxide in methanol (concentration: 4% by mass) as a saponification catalyst, such that a molar ratio of sodium hydroxide to vinyl acetate units in the ethylene-vinyl ester copolymer was 0.02. The solution of the ethylene-vinyl ester copolymer and the solution of the saponification catalyst were mixed by a static mixer, to give a mixture. The mixture paste thus obtained was placed on a belt and kept at 40° C. for 18 min to allow a saponification reaction to proceed. Thus, a solid block containing the ethylene-vinyl alcohol copolymer and the solvent was obtained. The polymerization conditions and the saponification conditions are summarized in Table 1.

(Pulverizing Step)

The solid block obtained in the saponification step was pulverized by a uniaxial-shear crusher to give wet particles. The crusher was equipped with a cutting blade with a Rockwell hardness of 55, and a rotation speed of the cutting blade was 500 rpm.

(Deliquoring Step)

The wet particles obtained in the pulverizing step was deliquored by a screw discharge type centrifugal deliquoring machine, to give deliquored particles, in which a proportion of particles passing through a sieve with a mesh size of 5.6 mm was 87% by mass, a proportion of particles passing through a sieve with a mesh size of 1.0 mm was 0.5% by mass, and a solvent content was 44% by mass. The pulverization conditions and the deliquoring conditions are summarized in Table 2.

(Drying Step)

To a drier in which an internal temperature was controlled such that a particle temperature was 100° C. was continuously fed 600 kg/hr (solid) of deliquored particles obtained in the deliquoring step. An average residence time of the particles in the drier was 4 hours.

(Additional Pulverizing Step)

The dry particles obtained in the drying step were further pulverized by a hammer mill, and passed through a filter with a mesh size of 1.4 mm, to give an ethylene-vinyl alcohol copolymer 1. A content of ethylene units in the ethylene-vinyl alcohol copolymer 1 was 6 mol %; a viscosity-average polymerization degree was 1000; and a saponification degree was 99.2 mol %. For ethylene-vinyl alcohol copolymer 1, a Cw (30° C.) was 51.4%, a Cw (70° C.) was 16.8%, and a value of formula (I) was 16.8. Furthermore, in the whole ethylene-vinyl alcohol copolymer 1, a proportion of particles passing through a filter with a mesh size of 2.5 mm was 99% by mass; a proportion of particles passing through a filter with a mesh size of 1.0 mm was 93% by mass; and a proportion of particles passing through a filter with a mesh size of 0.15 mm was 7% by mass. Table 3 summarizes the results of evaluation of polymerization degree, saponification degree, crystallinities in water at 30° C. and 70° C., and value of formula (I) of ethylene-vinyl alcohol copolymer 1 in accordance with the above-described method.

Production Examples 2 to 6

Ethylene-vinyl alcohol copolymers (Copolymers 2 to 6) were produced as described in Production Example 1, varying the conditions of polymerization, saponification, pulverization and deliquoring as shown in Tables 1 and 2. The copolymers obtained were evaluated as described in Production Example 1, and the results are summarized in Table 3.

TABLE 1

| | Copolymer | Polymerization conditions | | | | | Saponification conditions | |
|---|---|---|---|---|---|---|---|---|
| | | Ethylene (MPa) | Vinyl acetate (L/hr) | Methanol (L/hr) | Initiator (L/hr) | Polymerization ratio (%) | PVAc concentration (% by mass) | NaOH (molar ratio) |
| Production Example 1 | Copolymer 1 | 0.61 | 631 | 160 | 7.6 | 43 | 40 | 0.02 |
| Production Example 2 | Copolymer 2 | 0.69 | 626 | 170 | 75.8 | 70 | 45 | 0.015 |
| Production Example 3 | Copolymer 3 | 0.23 | 671 | 147 | 2.6 | 30 | 32 | 0.01 |
| Production Example 4 | Copolymer 4 | 0.26 | 741 | 64 | 1.7 | 26 | 25 | 0.02 |
| Production Example 5 | Copolymer 5 | 0.26 | 741 | 64 | 1.7 | 26 | 25 | 0.02 |
| Production Example 6 | Copolymer 6 | 0.23 | 671 | 147 | 2.6 | 30 | 32 | 0.01 |

TABLE 2

| | Copolymer | Pulverization conditions | | Deliquoring conditions Type of a deliquoring machine | Deliquored particles | | |
|---|---|---|---|---|---|---|---|
| | | Rotation speed (rpm) | Rockwell hardness | | Passing through a mesh size 5.6 mm (% by mass) | Passing through a mesh size 1.0 mm (% by mass) | Liquid content (% by mass) |
| Production Example 1 | Copolymer 1 | 500 | 55 | Screw discharge type centrifugal deliquoring machine | 87 | 0.5 | 44 |
| Production Example 2 | Copolymer 2 | 450 | 60 | Screw discharge type centrifugal deliquoring machine | 98 | 1.8 | 50 |
| Production Example 3 | Copolymer 3 | 250 | 45 | Screw discharge type centrifugal deliquoring machine | 94 | 1.6 | 58 |
| Production Example 4 | Copolymer 4 | 400 | 50 | Screw discharge type centrifugal deliquoring machine | 85 | 0.1 | 50 |
| Production Example 5 | Copolymer 5 | 450 | 60 | Squeeze deliquoring machine | 100 | 20 | 40 |
| Production Example 6 | Copolymer 6 | 600 | 35 | Squeeze deliquoring machine | 76 | 2.3 | 62 |

TABLE 3

| | Copolymer | Ethylene-vinyl alcohol copolymer (A) | | | | | | | | |
|---|---|---|---|---|---|---|---|---|---|---|
| | | Content of ethylene units (mol %) | Polymerization degree | Saponification degree (mol %) | Passing through a mesh size 2.5 mm (% by mass) | Passing through a mesh size 1.0 mm (% by mass) | Passing through a mesh size 0.15 mm (% by mass) | Cw (30° C.) (%) | Cw (70° C.) (%) | Value of formula (I) |
| Production Example 1 | Copolymer 1 | 6 | 1000 | 99.2 | 99 | 93 | 7 | 51.4 | 16.8 | 16.8 |
| Production Example 2 | Copolymer 2 | 10 | 400 | 98.0 | 99 | 93 | 12 | 69.1 | 26.7 | 13.1 |
| Production Example 3 | Copolymer 3 | 2 | 1700 | 93.0 | 99 | 94 | 5 | 9.7 | 2.1 | 6.9 |
| Production Example 4 | Copolymer 4 | 2 | 2300 | 99.3 | 80 | 4 | 0.1 | 49.6 | 15 | 17.4 |
| Production Example 5 | Copolymer 5 | 2 | 2300 | 99.3 | 99 | 95 | 11 | 56 | 5.4 | 22.3 |
| Production Example 6 | Copolymer 6 | 2 | 1700 | 93.0 | 99 | 94 | 7 | 4.6 | 1.6 | 2.9 |

Example 1

(Preparation of an Aqueous Solution and Evaluation of Lump Forming Properties)

In a 500 mL separable flask equipped with a condenser tube was charged 288 g of an aqueous solution of 255 g of water and 33.2 g of 2-propanol as a solvent, which was then heated to an internal temperature of 70° C. After heating, to the solution was added 32 g of an ethylene-vinyl alcohol copolymer 1 with stirring at 150 rpm. Here, a content of 2-propanol was 13.0 parts by mass based on 100 parts of water and a content of the copolymer 1 was 12.5 parts by mass based on 100 parts by mass of water. The state of the copolymer 1 immediately after addition was visually observed and lump forming properties were evaluated according to the following criteria. No lumps were observed.

A: No lumps were formed.
B: Lumps were formed, but disappeared by stirring for 5 min.
C: Lumps were formed and did not disappear after stirring for 5 min.

(Evaluation of Solubility of an Ethylene-Vinyl Alcohol Copolymer (A))

After observing lump forming properties, the mixture was heated to an internal temperature of 85° C., and then stirred at 150 rpm for further 30 min.

After the stirring for 30 min, the aqueous solution of ethylene-vinyl alcohol copolymer was collected. The aqueous solution collected was filtrated through a No. 5A filter paper, and the filtrate obtained was dried at 125° C. for 3 hours. Then, a mass A (g) of the ethylene-vinyl alcohol copolymer dissolved in the aqueous solution was determined. Separately, the ethylene-vinyl alcohol copolymer 1 in an equal amount to the ethylene-vinyl alcohol copolymer added to the aqueous solution was dried at 125° C. for 3 hours, and then, the amount B (g) of non-volatile contents was determined. Then, Solubility (% by mass)=A/B×100 was calculated. A calculated solubility was 56%, and thus, solubility was rated as level B.

A: 60% by mass or more
B: 50% by mass or more and less than 60% by mass
C: less than 50% by mass (Evaluation of Generation of Fibrillar Precipitate in an Aqueous Solution)

After observing lump forming properties, the mixture was heated to an internal temperature of 95° C., and stirred at 95° C. and 150 rpm for one hour, to give an aqueous solution in which the ethylene-vinyl alcohol copolymer 1 was dissolved. The aqueous solution thus obtained was cooled to room temperature (20° C.), and 100 mL of the solution was transferred to a 300 mL Erlenmeyer flask. After placing a 4 cm magnetic stirrer, the solution was stirred at 200 rpm for 5 min. Then, the stirring was stopped and generation of fibrillar precipitate was evaluated in accordance with the following criteria, and no fibrillar precipitate was generated.

A: No fibrillar precipitate was generated.
B: Fibrillar precipitate was generated.

(Production of a Coated Article)

The aqueous solution prepared as described above for determining generation of fibrillar precipitate was applied to a corona-treated polyethylene terephthalate film using a bar coater, and then dried at 100° C. for 5 min, to produce a coated article which was coated with the ethylene-vinyl alcohol copolymer 1. The coating amount was 26 g/m².

(Appearance of a Coated Article)

The coated surface of the coated article was visually observed for particles, and evaluated in accordance with the following criteria.

A: No particles were observed.
B: Particles were observed.

(Oxygen Barrier Properties of a Coated Article)

For the coated article obtained above, an oxygen transmission rate was measured under the conditions of 85% RH and 20° C. using MOCON type OX-TRAN2/20 from Modern Control, Inc. in accordance with an equal pressure method described in JIS K7126 (2006). Herein, an "oxygen transmission rate" is determined by converting an oxygen transmission rate (unit: cc/m²·day·atm) measured with a given film thickness to that for a film thickness of 20 μm (cc·20 μm/m²·day·atm). The less an oxygen transmission rate is, the more excellent oxygen barrier properties are.

Examples 2 to 6, and Comparative Examples 1 to 7

Aqueous solutions were prepared as described in Example 1, varying the type and the amount of an ethylene-vinyl alcohol copolymer (A) used, and the type and the amount of an alcohol (B) as shown in Table 4. The aqueous solution obtained was evaluated for lump forming properties, solubility and generation of fibrillar precipitate as described in Example 1. Furthermore, a coated article was produced using the aqueous solution obtained as described in Example 1, and evaluated for appearance and oxygen barrier properties. For Comparative Examples 3, 4 and 7, fibrillar precipitate was observed in an aqueous solution and particles were observed in a coated article, and therefore, oxygen barrier properties were not evaluated. Furthermore, for Comparative Examples 5 and 7, the ethylene-vinyl alcohol copolymer (A) was not soluble in an aqueous solution, and therefore, subsequent evaluations were not conducted. The results are shown in Table 4.

TABLE 4

| | Copolymer | | Alcohol (B) | | Evaluation of an aqueous solution | | | Evaluation of a coated article | |
| --- | --- | --- | --- | --- | --- | --- | --- | --- | --- |
| | Type | Content (parts by mass/ 100 parts by mass of water) | Type | Content (parts by mass/ 100 parts by mass of water) | Lump forming properties | Solubility | Generation of fibrils | Appearance | Oxygen transmission rate (cc · 20 μm/ m² · day · atm) |
| Example 1 | Copolymer 1 | 12.5 | 2-propanol | 13 | A | B | A | A | 17 |
| Example 2 | Copolymer 1 | 13 | methanol | 20 | A | B | A | A | 16 |
| Example 3 | Copolymer 2 | 3.5 | 2-propanol | 13 | A | A | A | A | 11 |
| Example 4 | Copolymer 3 | 1 | ethanol | 0.1 | A | A | A | A | >50 |
| Example 5 | Copolymer 3 | 31 | ethanol | 25 | B | A | A | A | >50 |
| Example 6 | Copolymer 4 | 12 | ethanol | 10 | A | B | A | A | 30 |

TABLE 4-continued

| | Copolymer | | Alcohol (B) | | Evaluation of an aqueous solution | | | Evaluation of a coated article | |
|---|---|---|---|---|---|---|---|---|---|
| | Type | Content (parts by mass/ 100 parts by mass of water) | Type | Content (parts by mass/ 100 parts by mass of water) | Lump forming properties | Solubility | Generation of fibrils | Appearance | Oxygen transmission rate (cc · 20 μm/ m² · day · atm) |
| Comparative Example 1 | Copolymer 5 | 12 | 2-propanol | 10 | A | C | A | A | 35 |
| Comparative Example 2 | Copolymer 6 | 12.5 | 2-propanol | 13 | C | C | A | A | >50 |
| Comparative Example 3 | Copolymer 2 | 1 | methanol | 0.005 | A | A | B | B | — |
| Comparative Example 4 | Copolymer 1 | 11 | — | — | A | B | B | B | — |
| Comparative Example 5 | Copolymer 4 | 22 | 2-propanol | 100 | A | C | Insoluble | — | — |
| Comparative Example 6 | Copolymer 6 | 31 | ethanol | 25 | C | C | A | A | >50 |
| Comparative Example 7 | Copolymer 1 | 12.5 | 2-propanol | 0.005 | A | B | B | B | — |

The invention claimed is:

1. An aqueous solution comprising:
an ethylene-vinyl alcohol copolymer (A),
an alcohol (B) having 1 to 4 carbon atoms, and
water (C),
wherein
an ethylene unit content of the ethylene-vinyl alcohol copolymer (A) is 1 mol % or more and less than 20 mol %;
a crystallinity in water Cw (30° C.) at 30° C. and a crystallinity in water Cw (70° C.) at 70° C. as determined by pulse NMR satisfy Formula (I);
the ethylene-vinyl alcohol copolymer (A) is contained in 0.1 to 100 parts by mass based on 100 parts by mass of water (C); and
the alcohol (B) is contained in 0.01 to 30 parts by mass based on 100 parts by mass of water (C)

$$4 \leq \frac{100 - Cw(30° \text{ C.})}{100} \times [Cw(30° \text{ C.}) - Cw(70° \text{ C.})] \leq 22. \quad (I)$$

2. The aqueous solution according to claim 1, wherein the alcohol (B) is a monohydric alcohol having 1 to 4 carbon atoms.

3. The aqueous solution according to claim 1, wherein the ethylene-vinyl alcohol copolymer (A) has a viscosity-average polymerization degree of 200 to 5000.

4. The aqueous solution according to claim 1, wherein the ethylene-vinyl alcohol copolymer (A) has a saponification degree of 80 to 99.99 mol %.

* * * * *